US010053153B2

(12) United States Patent
Kobayashi et al.

(10) Patent No.: US 10,053,153 B2
(45) Date of Patent: Aug. 21, 2018

(54) FOUR WHEEL VEHICLE

(71) Applicant: HONDA MOTOR CO., LTD., Minato-ku, Tokyo (JP)

(72) Inventors: Naoki Kobayashi, Niiza (JP); Kuniaki Ikui, Kawasaki (JP); Takahiro Kato, Tsurugashima (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/421,894

(22) Filed: Feb. 1, 2017

(65) Prior Publication Data

US 2017/0225715 A1    Aug. 10, 2017

(30) Foreign Application Priority Data

Feb. 4, 2016    (JP) .................. 2016-020197

(51) Int. Cl.
*B60K 1/04*    (2006.01)
*B62D 23/00*    (2006.01)
(Continued)

(52) U.S. Cl.
CPC ............. *B62D 23/005* (2013.01); *B60G 3/06* (2013.01); *B60G 3/14* (2013.01); *B60G 7/008* (2013.01);
(Continued)

(58) Field of Classification Search
CPC .... B62D 23/005; B62D 21/02; B62D 21/183; B60K 1/04; B60K 2001/003; B60K 2001/0422; B60K 2001/0438
See application file for complete search history.

(56) References Cited

U.S. PATENT DOCUMENTS 4,799,708 A * 1/1989 Handa .................. B62D 21/183
280/124.136
4,817,985 A * 4/1989 Enokimoto .............. B60G 3/24
280/124.143
(Continued)

FOREIGN PATENT DOCUMENTS

EP    1 834 867 A2    9/2007
EP    2 329 980 A2    6/2011
(Continued)

OTHER PUBLICATIONS

Extended European Search Report issued in the corresponding EP Patent Application 17152583.5 and dated Jun. 19, 2017.

*Primary Examiner* — James A Shriver, II
*Assistant Examiner* — Steve Clemmons
(74) *Attorney, Agent, or Firm* — Carrier Blackman & Associates, P.C.; Joseph P. Carrier; Jingli Wang (57) ABSTRACT

The four wheel vehicle uses an electric motor (142) for driving the vehicle and a battery unit (160) for supplying electric power to the electric motor. The lower chassis (5) of the vehicle includes a pair of front side frames (10) extending linearly in a fore and aft direction with an upward slant and a progressively increasing lateral mutual spacing from a front part thereof to a rear part thereof and a plurality of cross members (14, 16, 18) connecting the front side frames to each other. The battery unit is positioned between the two front side frames such that the battery unit overlaps with the front side frames in side view. Thereby, the battery unit can be effectively protected from side impacts.

7 Claims, 9 Drawing Sheets

(51) Int. Cl.
    *B62D 29/00*    (2006.01)
    *B60N 2/015*    (2006.01)
    *B60N 2/20*     (2006.01)
    *B60G 3/14*     (2006.01)
    *B60G 3/06*     (2006.01)
    *B60G 7/02*     (2006.01)
    *B60G 7/00*     (2006.01)
    *B60G 11/15*    (2006.01)
    *B60G 13/00*    (2006.01)
    *B60G 15/02*    (2006.01)
    *B60L 11/18*    (2006.01)
    *B60R 21/13*    (2006.01)
    *B62D 21/15*    (2006.01)
    *B62D 27/02*    (2006.01)

(52) U.S. Cl.
    CPC ............. *B60G 7/02* (2013.01); *B60G 11/15* (2013.01); *B60G 13/003* (2013.01); *B60G 13/005* (2013.01); *B60G 15/02* (2013.01); *B60K 1/04* (2013.01); *B60L 11/1818* (2013.01); *B60L 11/1864* (2013.01); *B60L 11/1877* (2013.01); *B60N 2/015* (2013.01); *B60N 2/20* (2013.01); *B60R 21/13* (2013.01); *B62D 21/157* (2013.01); *B62D 27/02* (2013.01); *B62D 29/007* (2013.01); *B60G 2202/10* (2013.01); *B60G 2202/12* (2013.01); *B60G 2204/128* (2013.01); *B60G 2204/129* (2013.01); *B60G 2204/12422* (2013.01); *B60G 2300/50* (2013.01); *B60L 2210/10* (2013.01); *B60Y 2306/01* (2013.01)

(56) References Cited

U.S. PATENT DOCUMENTS

| | | | | |
|---|---|---|---|---|
| 4,924,959 A | * | 5/1990 | Handa | B62D 21/183 123/185.3 |
| 5,392,873 A | * | 2/1995 | Masuyama | B60R 16/04 180/68.5 |
| 5,918,692 A | | 7/1999 | Sekita et al. | |
| 6,227,322 B1 | * | 5/2001 | Nishikawa | B60R 16/04 180/65.1 |
| 7,824,797 B2 | * | 11/2010 | Nishino | B60K 1/04 429/154 |
| 7,993,155 B2 | * | 8/2011 | Heichal | B60K 1/04 180/65.1 |
| 8,939,242 B2 | * | 1/2015 | Kurakawa | H01M 2/1083 180/65.1 |
| 8,939,246 B2 | * | 1/2015 | Yamaguchi | B60K 1/04 180/311 |
| 9,174,520 B2 | * | 11/2015 | Katayama | B60K 1/04 |
| 9,387,751 B2 | | 7/2016 | Kashiwai et al. | |
| 9,444,082 B2 | * | 9/2016 | Tsujimura | H01M 2/1077 |
| 2011/0297467 A1 | * | 12/2011 | Iwasa | B60K 1/04 180/65.31 |
| 2011/0300426 A1 | * | 12/2011 | Iwasa | B60K 1/04 429/99 |
| 2012/0103714 A1 | * | 5/2012 | Choi | B60K 1/04 180/68.5 |
| 2013/0127200 A1 | | 5/2013 | Saeki | |
| 2013/0168177 A1 | | 7/2013 | Takagi | |
| 2017/0267121 A1 | * | 9/2017 | Kotik | B60L 11/1879 |

FOREIGN PATENT DOCUMENTS

| | | | | |
|---|---|---|---|---|
| FR | 2961771 A1 | * | 12/2011 | ............. B60K 1/04 |
| FR | 2962376 A1 | * | 1/2012 | ............. B60K 1/00 |
| JP | 2014-094617 A | | 5/2014 | |
| JP | 2015-089806 A | | 5/2015 | |
| WO | WO-2013084940 A1 | * | 6/2013 | ............. B60K 1/04 |
| WO | WO-2014038346 A1 | * | 3/2014 | ............. B60K 1/04 |

* cited by examiner

FOUR WHEEL VEHICLE

TECHNICAL FIELD

The present invention relates to a four wheel vehicle, and in particular but not exclusively to a four wheel vehicle including an electric motor for propelling the vehicle and a battery unit for providing electric current to the electric motor.

BACKGROUND ART

An electrically powered four wheel vehicle typically includes a pair of side sill members extending horizontally in a fore and aft direction in a mutually parallel relationship, a pair of front side members connected to the front ends of the respective side sill members in a mutually parallel relationship, and a rear sub frame having a ladder or a cage structure connected to the rear ends of the side sill members. A pair of front wheels are supported by the front side members via respective strut suspension systems, and a pair of rear wheels are supported by the rear sub frame via respective strut or wishbone suspensions systems. A power unit including an electric motor is mounted on the rear sub frame. A front seat is positioned between the two side sill members, and a pair of rear seats are positioned on the rear sub frame. A battery unit for providing electric current to the electric motor is positioned under the front seat. See JP2014-94617A, for instance. JP2015-89806A discloses a slightly different electric four wheel vehicle.

Such a four wheel vehicle carries various electric devices such as an inverter for controlling the electric power supplied from the battery unit to the electric motor, such as an inverter, a DC/DC converter and an electronic control unit. In conventional electric vehicles, these electric devices were typically positioned above the power unit or on either side of the battery unit. In the former case, the space above the power unit is not available for the installation of a rear seat or a luggage storage space. In the latter case, the width of the vehicle body becomes undesirably great or the space for accommodating the battery unit is limited.

BRIEF SUMMARY OF THE INVENTION

In view of such problems of the prior art, a primary object of the present invention is to provide a four wheel vehicle in which a space for installing a rear seat or a luggage storage space can be created above the power unit.

A second object of the present invention is to provide a four wheel vehicle which allows an ample space for accommodating a battery unit without unduly increasing the width of the vehicle body.

The present invention achieves such objects by providing a four wheel vehicle including a pair of front wheels (86) and a pair of rear wheels (106), comprising: a lower chassis (5) including a pair of side frames (10, 12) extending in a fore and aft direction and at least one cross member (14, 16, 18, 20, 22) connected between the two side frames; a front seat (56) positioned on the lower chassis between the front wheels and the rear wheels; a front suspension system (93) provided on a front end part of each side frame for supporting the corresponding front wheel; a rear suspension system (117) provided on a rear end part of each side frame for supporting the corresponding rear wheel; an electric motor (142) provided between the two rear wheels and between the two side frames for driving the rear wheels; a battery unit (160) positioned between the two side frames and under the front seat; and a power control unit (180) positioned longitudinally between the battery unit and the electric motor and laterally between the two side frames for controlling electric power supplied from the battery unit to the electric motor.

In this arrangement, as the battery unit, the power control unit and the electric motor are arranged in a single file, cables and a wire harness can be extended in a shortest possible path so that the power efficiency can be improved, and the manufacturing cost can be minimized. Also, the space above the electric motor is not occupied by the power control unit, and can be used for a rear seat or a luggage storage space.

In a preferred embodiment of the present invention, the battery unit is encased in a horizontally disposed rectangular box, and the side frames extend linearly in the fore and aft direction with an upward slant from a front part thereof to a rear part thereof such that the side frames extend diagonally across the battery unit in side view.

Thereby, the battery unit is favorably protected from side impacts by the side frames.

Preferably, a lower part of the battery unit is at least partly or entirely positioned below bottom surfaces of the side frames.

Thereby, the battery unit is exposed to the ambient air so that the battery unit is favorably cooled by the wind created by the movement of the vehicle.

According to a particularly preferred embodiment of the present invention, the battery unit is supported by a battery mount band (170, 176) extending along a lower surface of the battery unit and fastened to the side frames in a detachable manner.

Thereby, the battery unit can be securely fixed to the vehicle, but can be attached and detached to and from the vehicle body from below without any difficulty.

According to a particularly preferred embodiment of the present invention, a rear end part of the battery unit consists of a lower extension (166B) having a reduced height and extending under the power control unit.

The lower extension may be used for housing accessory devices or wiring for the battery unit, and the power control unit can be positioned at least partly above the lower extension in a space efficient manner.

In this case, a cable (196) connected between the battery unit and the power control unit may extend from an upper wall of the lower extension to a bottom wall of the power control unit opposing the lower extension.

Thereby, the power control unit and the battery unit can be connected by cables of a minimum length. Also, by using a suitable connector on either end of the cables, the battery unit can be installed into the vehicle from below such that the connector can be connected automatically or in an otherwise effortless manner.

In a preferred embodiment of the present invention, the power control unit comprises an electric power conversion unit (186) including an inverter and a DC/DC converter, and an electronic control unit (188) for controlling supply of electric power to the electric motor; and wherein the electric power conversion unit is housed in a casing (202) separate from the electronic control unit, and the casing is provided with a positive ventilation unit (208).

Thereby, the heat generated in the electric power conversion unit is favorably removed by the positive ventilation, and is prevented from adversely affecting the electronic control unit.

By making use of the space made available above the electric motor, a rear seat (68) may be positioned on the lower chassis above the electric motor.

DESCRIPTION OF THE PREFERRED EMBODIMENT(S)

A four wheel vehicle embodying the present invention is described in the following with reference to FIGS. 1 to 9. In the following disclosure, various component parts are joined together by any per se known joining method such as welding, bonding and brazing among other possibilities.
(Lower Chassis Structure)

As shown in FIGS. 1 to 5, the four wheel vehicle of the illustrated embodiment includes a lower frame (lower chassis) 5 including a pair front side frames 10 and a pair of rear side frames 12 located on either side of the vehicle body. The front side frames 10 and the rear side frames 12 are each formed by an elongated straight steel member preferably made of a stamp formed member, a pipe member or any other member preferably having a closed cross section.

The front side frames 10 extend linearly at an angle relative to a horizontal plane, and with a progressively increasing spacing between the two front side frames 10 toward the rear ends thereof, and are disposed in a symmetric relationship with respect to an imaginary central vertical plane extending centrally through the vehicle body. Therefore, the front side frames 10 (in cooperation with cross members which will be described hereinafter) present a trapezoidal shape in plan view with the base thereof extending laterally between the rear ends thereof.

The rear side frames 12 extend in parallel to each other with an upward slope toward the rear ends thereof in linear continuation with the rear ends of the respective front side frame 10, and are joined to the upper surfaces of the rear ends of the respect front side frames 10 with a prescribed overlap extending in the fore and aft direction. In the illustrated embodiment, these overlapping portions 11 extend as continuations of the rear ends of the front side frames 10 to the front ends of the respective rear side frames 12, and the rear ends of the respective front side frames 10 are slightly bent in the inboard direction so as to conform to the corresponding front ends of the rear side frames 12. Alternatively, the front ends of the rear side frames 12 may be slightly bent in the inboard direction so as to conform to the corresponding rear ends of the front side frames 10.

In an alternate arrangement, the rear side frames 12 extend horizontally and in parallel to each other. In this case also, the rear ends of the respective front side frames 10 and/or the front ends of the rear side frames 12 may be slightly bent so that no pronounced discontinuity may be created in the overlapping portions 11.

The lower frame 5 further includes a front end cross member 14 made of a square pipe and extending horizontally and laterally between the front ends of the front side frames 10, a first front middle cross member 16 made of a round pipe extending horizontally and laterally between the inboard surfaces of relatively front parts of the front side frames 10, and a second front middle cross member 18 made of a round pipe extending horizontally and laterally between the bottom surfaces of intermediate parts of the front side frames 10 and behind the first front middle cross member 16.

The lower frame 5 further includes a rear middle cross member 20 made of a square pipe and extending horizontally and laterally between the upper surfaces of the front end parts of the rear side frames 12 which overlap with the rear ends of the respective front side frames 10, and a rear end cross member 22 made of a square pipe and extending horizontally and laterally between the lower surfaces of the rear end parts of the rear side frames 12.

The lower frame 5 of the four wheel vehicle of the illustrated embodiment is thus formed as a ladder chassis.

The four wheel vehicle of the illustrated embodiment further includes a pair of sub side frames 118 extending inward of and below the rear side frames 12 in parallel with the rear side frames 12, and are each connected to an inboard side of a rear suspension bracket 100 (which will be described hereinafter) fixedly attached to the rear end part of the corresponding front side frame 10 at the front end thereof and to the lower end of a side stay member 120 extending vertically at the rear end thereof. Each sub side frame 118 may be made of a square pipe. The upper end of each side stay member 120 is connected to a corresponding part of the rear end cross member 22. Front end parts of the sub side frames 118 are connected each other by a sub cross member 122 extending laterally and horizontally. The sub cross member 122 is also made of a square pipe. The side stay members 120 are connected to each other by a pair of sub end cross member 124 and 126 in vertically intermediate parts thereof.
(Upper Body Structure)

Figure 1:
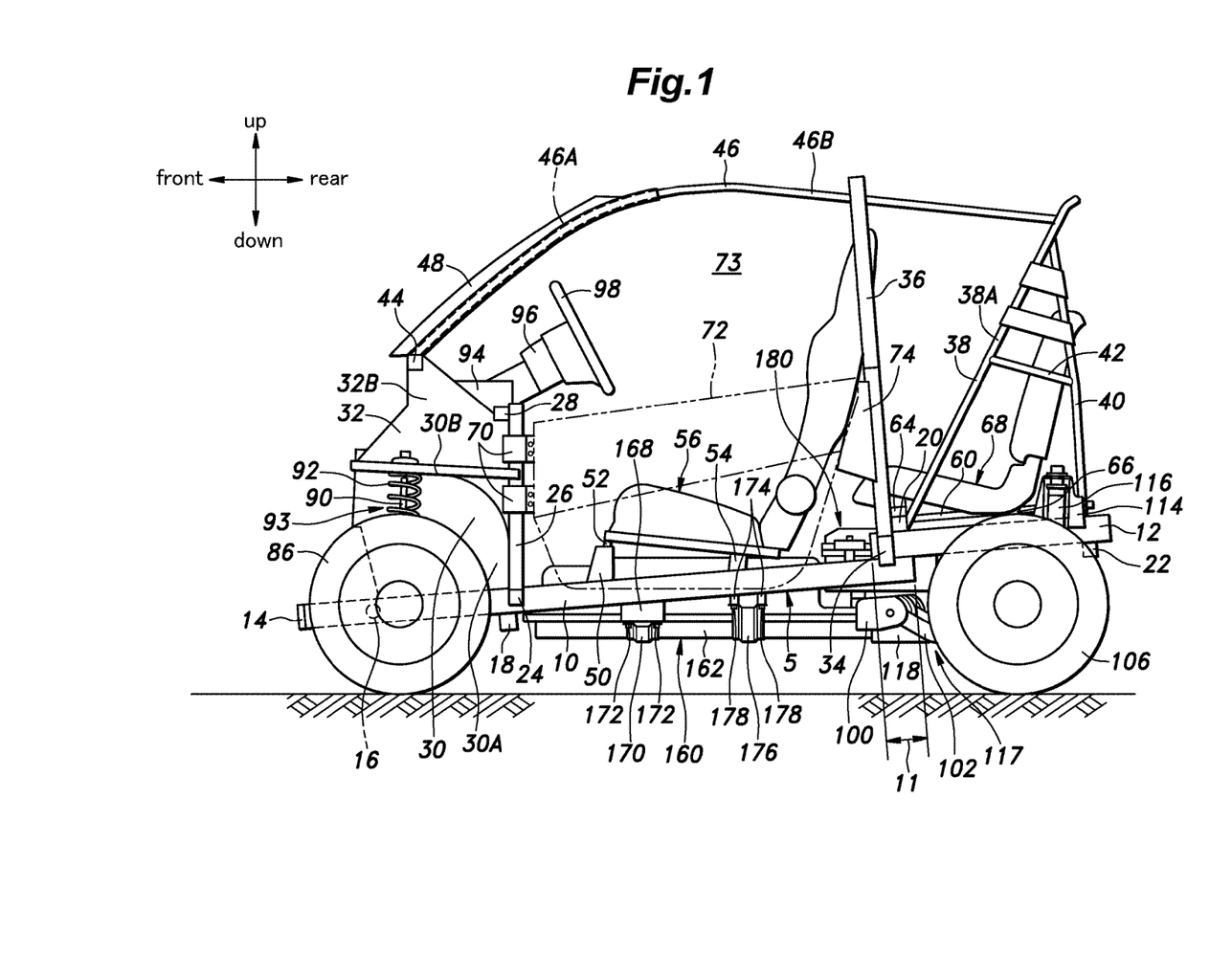
FIG. 1 is a side view of a four wheel vehicle embodying the present invention.
Figure 2:
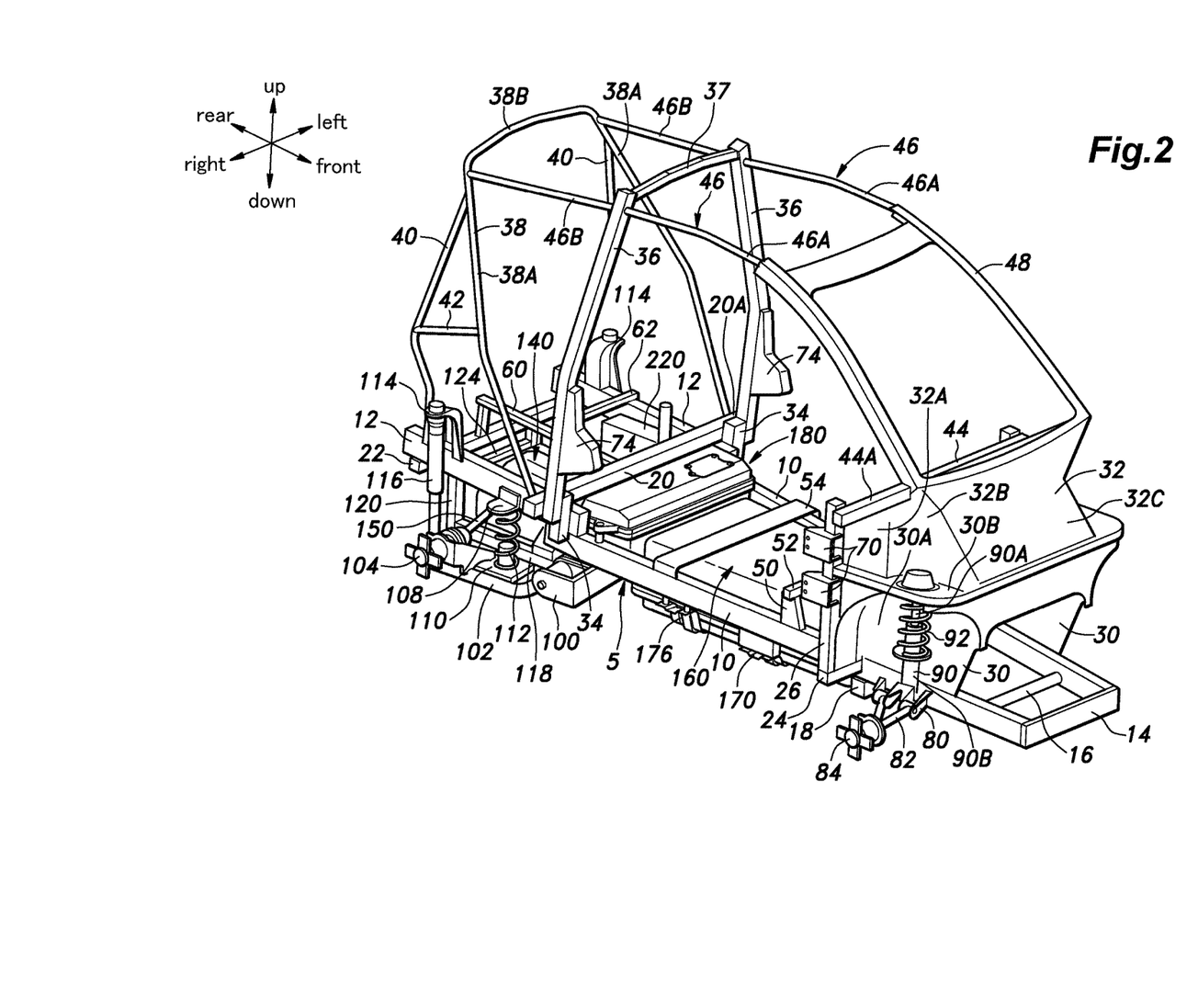
FIG. 2 is a perspective view showing the vehicle body structure of the four wheel vehicle.

As shown in FIGS. 1 and 2, an extension member 24 consisting of a square pipe projects from the outboard side of each front side frame 10 at a position longitudinally overlapping with the second front middle cross member 18. The free end of each extension member 24 is connected to the lower end of a vertically extending front lower pillar (A pillar) 26. The upper ends of the front lower pillars 26 are connected by a horizontally and laterally extending steering hanger frame 28 made of a square pipe.

A damper housing 30 made of stamp formed sheet metal is attached to each front side frame 10. More specifically, the damper housing 30 includes a vertical wall 30A having a lower edge attached to the corresponding front side frame 10, and a flange wall 30B extending in the outboard direction from a vertical rear edge and a horizontal upper edge of the vertical wall 30A so as to house the corresponding front wheel and the associated suspension system. The rear part of the flange wall 30B has a horizontal lower edge connected to the corresponding extension member 24 and a vertical outer edge connected to the corresponding front lower pillar 26.

A cowl panel 32 made of stamp formed sheet metal is positioned centrally on a front end part of the vehicle body. The cowl panel 32 is connected to the upper parts of the damper housings 30 at the lower part thereof, and is integrally formed with a pair of end walls 32A each having an outer edge connected to the corresponding front lower pillar 26, an upper edge connected to the steering hanger frame 28, a lower edge connected to the flange wall 30B, a pair of side walls 32B each formed as an extension of the end wall 32A that is bent forward and shaped in conformity with and overlaid on the upper part of the flange wall 30B, and a front wall 32C connected between the front edges of the side walls 32B and having a major plane generally facing in the forward direction.

The rear middle cross member 20 extends laterally beyond the outboard edges of the rear side frames 12, and the front side of each lateral end 20A thereof extending beyond the corresponding rear side frame 12 is connected to the upper end of a rear pillar base frame 34 made of a short square pipe. The rear pillar base frame 34 is also connected to the outboard sides of the parts of the front side frame 10 and the rear side frame 12 in the overlapping portion 11. A center pillar 36 also made of a square pipe is connected to both the front side of the lateral end 20A and the outboard side of the rear pillar base frame 34 at the lower end thereof. The upper ends of the center pillars 36 are connected to each other by a laterally extending upper cross member 37.

A roll bar 38 made of a round pipe is connected to either lateral end 20A of the rear middle cross member 20 at lower ends thereof. The roll bar 38 includes a pair of pillar portions 38A extending upward from the lower ends of the roll bar 38 with a certain rearward slant and an upper cross bar 38B connecting the upper ends of the pillar portions 38A with each other. A pair of rear brace bars 40 are each connected between an upper part of the corresponding pillar portion 38A and a rear end part of the corresponding rear side frame 12, and a reinforcement bar 42 is connected between the intermediate parts of each pillar portion 38A and the corresponding rear brace bar 40.

A laterally elongated cowl upper frame 44 made of a square pipe and extending laterally is attached to the upper edge of the cowl panel 32. The cowl upper frame 44 includes a pair of lateral ends 44A that extend beyond the respective side walls 32B, and are attached to the upper edges of the end wall 32A of the cowl panel 32. A pair of roof frames 46 extend on either side of an upper part of the vehicle body in a mutually parallel relationship, and are connected to end parts of the cowl upper frame 44. Each roof frame 46 made of a round pipe includes a front upper pillar portion 46A extending with a downward slope toward the front end thereof, and a roof side rail portion 46B extending substantially horizontally from the upper end of the corresponding front upper pillar portion 46A and connected to an upper end part of the corresponding pillar portion 38A of the roll bar 38. Each center pillar 36 is connected to the corresponding roof side rail portion 46B at an upper end part thereof.

A rectangular windshield frame member 48 is connected between the front upper pillar portions 46A for retaining a windshield (not shown in the drawings) therein.

A mounting bracket 50 is attached to the upper surface of an intermediate part of each front side frame 10. A laterally and horizontally extending front seat support member 52 made of a square pipe is mounted on the mounting brackets 50 at respective lateral ends thereof. A laterally and horizontally extending rear seat support member 54 is attached between parts of the front side frames 10 located behind the mounting brackets 50. A front seat 56 for a driver is mounted on the front seat support member 52 and the rear seat support member 54 in a detachable manner.

Although not shown in the drawings, a floor panel is provided between the two damper housings 30, and supports the feet of the driver seated on the front seat 56 while the lower part of the cowl panel 32 defines a leg room for the driver. As the power unit is not carried in the front part of the vehicle body, the front part of the vehicle body affords an ample space for the driver.

The rear part of the vehicle body includes a center frame 60 extending horizontally in the fore and aft direction and having a front end attached to a laterally intermediate part of the rear middle cross member 20. The rear end of the center frame 60 is attached to a laterally intermediate part of the rear end cross member 22 via a bracket 58. The rear part of the vehicle further includes a seat mount frame 62 extending laterally and horizontally between a longitudinally intermediate part of the center frame 60 and an intermediate part of the left rear side frame 12. A pair of seat mount members 64 are attached to the middle cross member 20 in a laterally spaced apart relationship, and another pair of seat mount members 66 are attached to the seat mount frame 62 in a laterally spaced apart relationship in a corresponding manner. A rear seat 68 for a single passenger is mounted on these seat mount members 64 and 66 in a detachable manner. In the illustrated embodiment, whereas the front seat 56 is positioned in a laterally central part of the vehicle body, the rear seat 68 is offset to the left from the laterally center part of the vehicle body.

Each front lower pillar 26 is fitted with a pair of door hinges 70 for a side door 72, and each center pillar 36 is fitted with a door lock 74 for selectively retaining the side door 72 in the closed position.

A side door opening 73 which can be closed and opened by the corresponding side door 76 is defined on each side of the vehicle body. The driver seated on the front seat 56 can get into and out of the vehicle through this door opening 73, and the passenger seated or to be seated on the rear seat 68 can also get out or into of the vehicle through this door opening 73 but only after tilting the seat back of the front seat 56 to the front.

(Front Suspension System)

Figure 3:
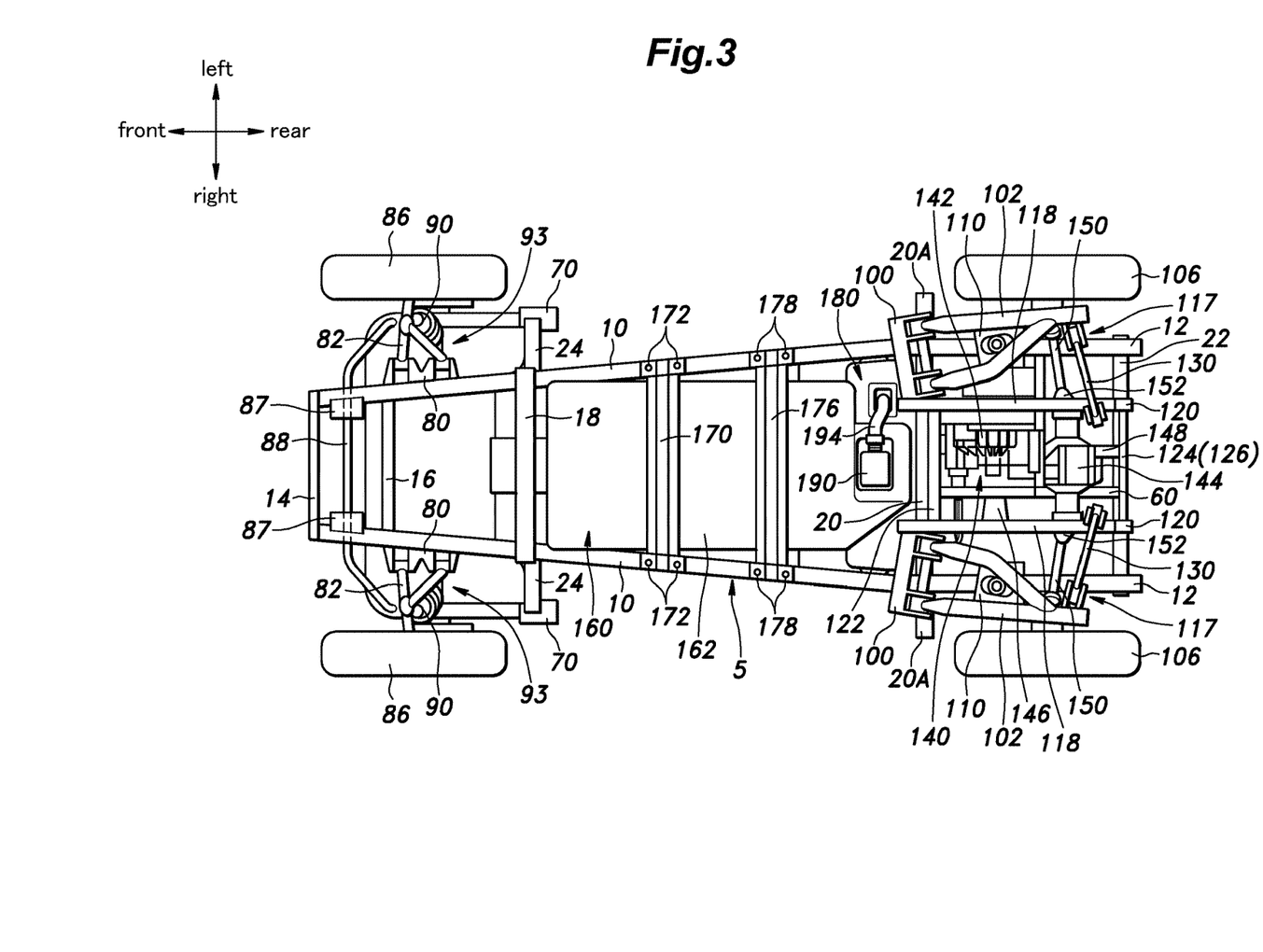
FIG. 3 is a plan view of the four wheel vehicle with the seats omitted from illustration.

As shown in FIGS. 1 to 3, a front suspension bracket 80 is fixedly attached to the outboard side of a front end part of each front side frame 10, and pivotally supports the base end of a lower arm 82 around a horizontally and longitudinally extending rotational center line. The lower arm 82 extends in the outboard direction, and rotatably supports a front wheel 86 at the free end thereof via a hub 84.

The two lower arms 82 are connected to each other by a stabilizer bar 88 which is in turn supported by the front side frames 10 via brackets 87 mounted on the respective front side frames 10.

In association with each front wheel 86, a damper 90 and a suspension spring 92 (consisting of a compression coil spring) are connected between the corresponding damper housing 30 and the corresponding lower arm 82. The damper 90 is provided with a piston rod 90A whose upper end is connected to the flange wall 30B of the damper housing 30 and a cylinder tube 90B whose lower end is pivotally connected to the lower arm 82. The suspension spring 92 surrounds the damper 90, and has an upper end supported by the flange wall 30B of the damper housing 30 and a lower end supported by a flange provided on the cylinder tube 90B. Thereby, a pair of front suspension systems 93 each consisting of a per se known strut suspension system are configured.

(Steering System)

As shown in FIG. 1, a steering column 96 is attached to the steering hanger frame 28 via a column mount 94. A steering wheel 98 is attached to the upper end of the steering column 96, and the lower end of the steering column 96 is connected to a per se known steering device not shown in the drawings which steers the front wheels 86 according to the rotational angle of the steering wheel 98.

(Rear Suspension System)

As shown in FIGS. 1 to 3, a rear suspension bracket 100 is attached to the bottom surface of a rear end part of each front side frame 10. A bifurcated base end (front end) of a semi-trailing arm 102 is attached to each rear suspension bracket 100 so as to be pivotable around a rotational center line extending substantially horizontally with a certain slant in plan view (such that the outboard side of the rotational center line is located ahead of the inboard side thereof). The rear end of each semi-trailing arm 102 extending rearward rotatably supports a rear wheel 106 in a rotatable manner via a hub 104.

A lateral rod 130 connects the rear end of each semi-trailing arm 102 with a part of the sub side frame 118 of the corresponding side in a pivotable manner.

An upper spring seat member 108 is attached to an intermediate part of each rear side frame 12, and projects in the outboard direction. A corresponding lower spring seat member 110 is attached to an intermediate part of each semi-trailing arm 102. A rear suspension spring 112 consisting of a compression coil spring is interposed between each lower spring seat member 110 and the corresponding upper spring seat member 108.

An upper bracket 114 extends upward from a rear end part of each rear side frame 12, and a damper 116 is interposed between an upper end of the upper bracket 114 and a free end part of the corresponding semi-trailing arm 102. Thereby, a pair of rear suspension systems 117 each consisting of a per se known semi-trailing arm suspension system are configured.

(Powertrain)

Figure 4:
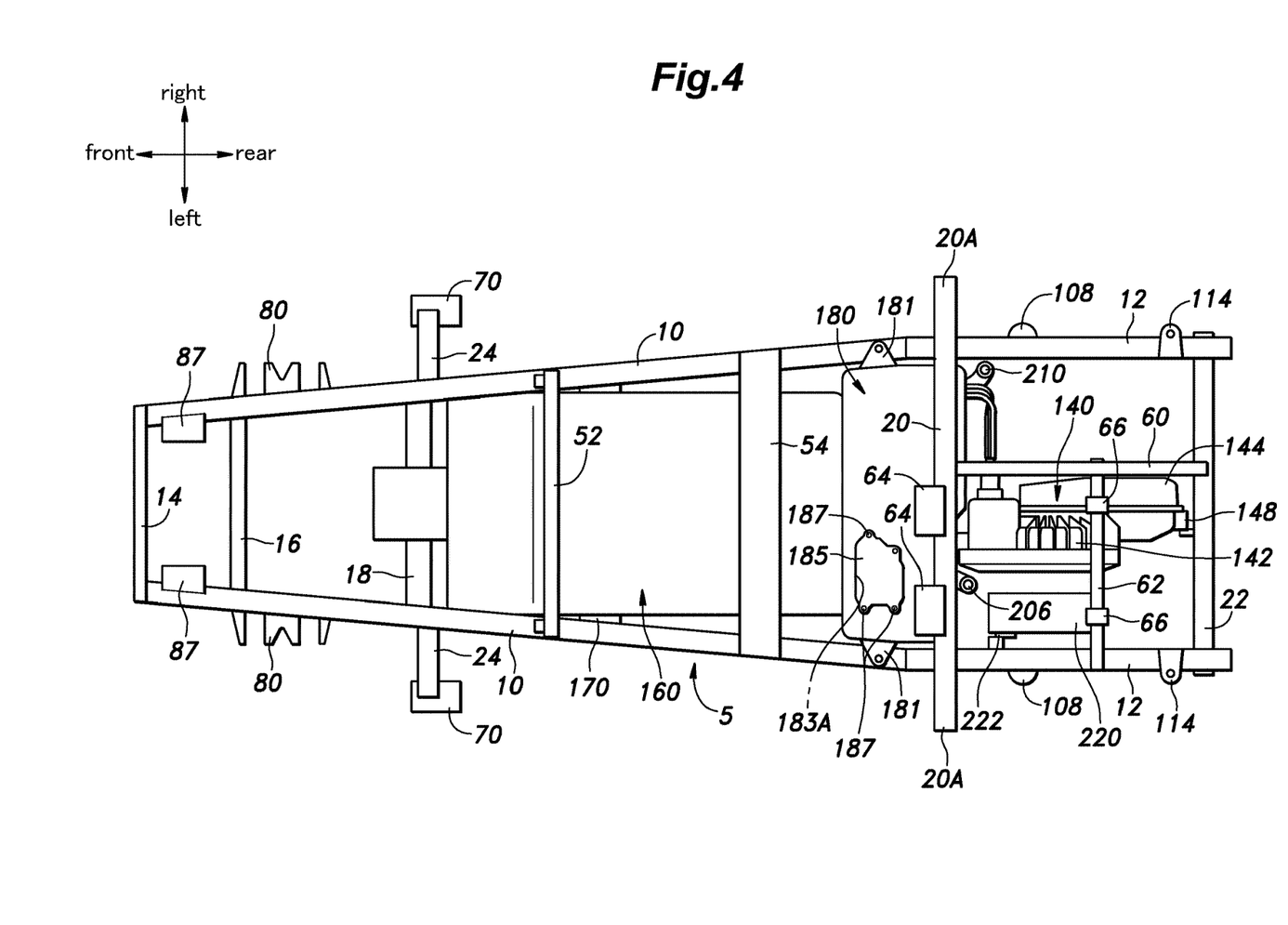
FIG. 4 is a plan view of the vehicle body structure of the four wheel vehicle.

As shown in FIGS. 3 and 4, a power unit 140 enclosed in a liquid tight casing is positioned between the two rear side frames 12, supported by the sub cross member 122 via a side motor bracket 146 at the right side part thereof, the sub cross member 122 via a front motor bracket 147 at the front end thereof, and the sub end cross members 124 and 126 via a rear end bracket 148 at the rear end thereof. The power unit 140 includes an electric motor 142 consisting of a PM motor and a reduction gear unit 144 consisting of a plurality of gears. As the upper end of the power unit 140 is exposed in the upward direction, an adequate space is afforded for the rear seat 68 to be installed.

A pair of axle shafts 150 extend from either side of the power unit 140 in either lateral direction, and the outer end of each axle shaft 150 is connected to the corresponding rear wheel 106 so that the rear wheels 106 are rotatively driven by the electric motor 142.

(Battery Unit and Power Control Unit)

As shown in FIGS. 1 to 5, a battery unit (battery pack) 160 includes a plurality battery cells (not shown in the drawings) such as lithium iron rechargeable battery cells encased in a gas tight casing 166 which consists of a longitudinally elongated rectangular base plate 162 and an upper case 164 secured to the base plate 162 along the outer periphery by using threaded bolts.

Figure 7:
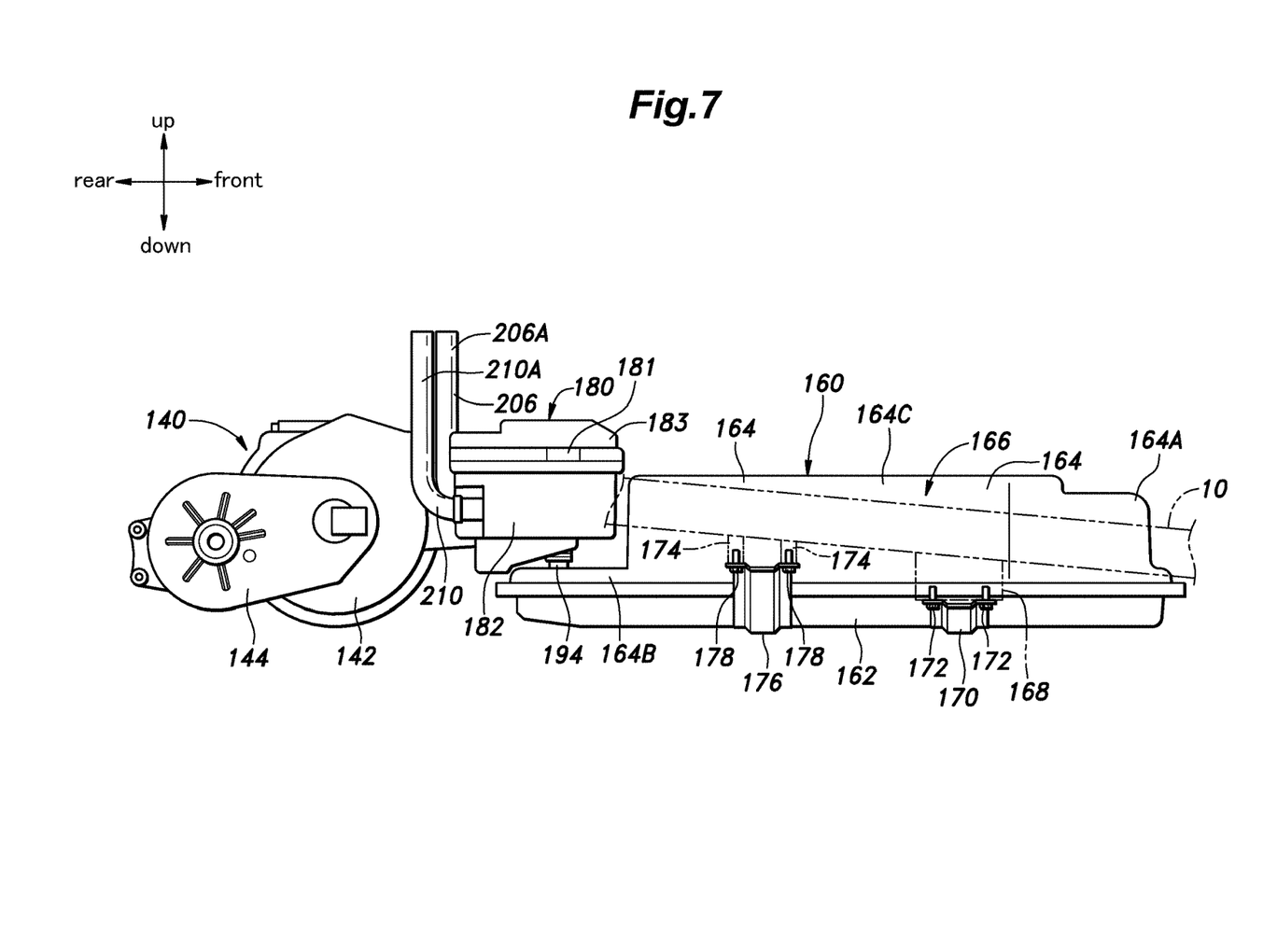
FIG. 7 is a side view of the battery unit, the power control unit and the power unit of the four wheel vehicle.

As shown in FIG. 7, a front battery mount 168 and a rear battery mount 174 are attached to the bottom surface of an intermediate part of each front side frame 10 one behind the other. The front battery mount 168 consists of a stamp formed bracket, and the rear battery mount 174 consists of a pair of collar members positioned one behind the other. The lower surface of the front side frame 10 is slanted, but the lower mounting surfaces of the front battery mount 168 and the rear battery mount 174 each extend along a horizontal plane. A front battery mount band 170 consisting of metallic band extends laterally across the bottom surface of the battery unit 160, and each end of the front battery mount band 170 is attached to the lower surface of the corresponding front battery mount 168 by using a pair of threaded bolts 172. Similarly, a rear battery mount band 176 consisting of metallic band extends laterally across the bottom surface of the battery unit 160 behind the front battery mount band 170, and each end of the rear battery mount band 176 is attached to the lower surface of the corresponding rear battery mount 174 by using a pair of threaded bolts 178, in a detachable manner in each case.

The vertical dimensions of the front battery mount 168 and the rear battery mount 174 are determined such that the front battery mount 168 and the rear battery mount band 176 jointly support the bottom surface of the base plate 162 in a horizontal manner. As the front battery mount 168 and the rear battery mount band 176 can be removed in the downward direction, along with the battery unit 160, by unfastening the threaded bolts 172 and 178, the assembling and servicing of the battery unit 160 can be facilitated.

Thus, the battery unit 160 is positioned horizontally under the front seat 56 between the front side frames 10 in an overlapping relationship with the front side frames 10 in side view. Whereas the front side frames 10 incline upward toward the rear end thereof, the battery unit 160 is positioned horizontally. Therefore, each front side frame 10 extends diagonally across the battery unit 160, in particular the upper case 164 thereof, in side view.

According to this arrangement, the lower part and the bottom part of the battery unit 160 protrude downward from the front side frames 10 so that the battery unit 160 is directly exposed to the wind created by the motion of the vehicle, and is thereby favorably cooled. The base plate 162 directly opposes the road surface, and serves as a protector for protecting the battery cells in the casing 166 from gravels and other foreign matters that may be kicked up from the road surface.

Figure 6:
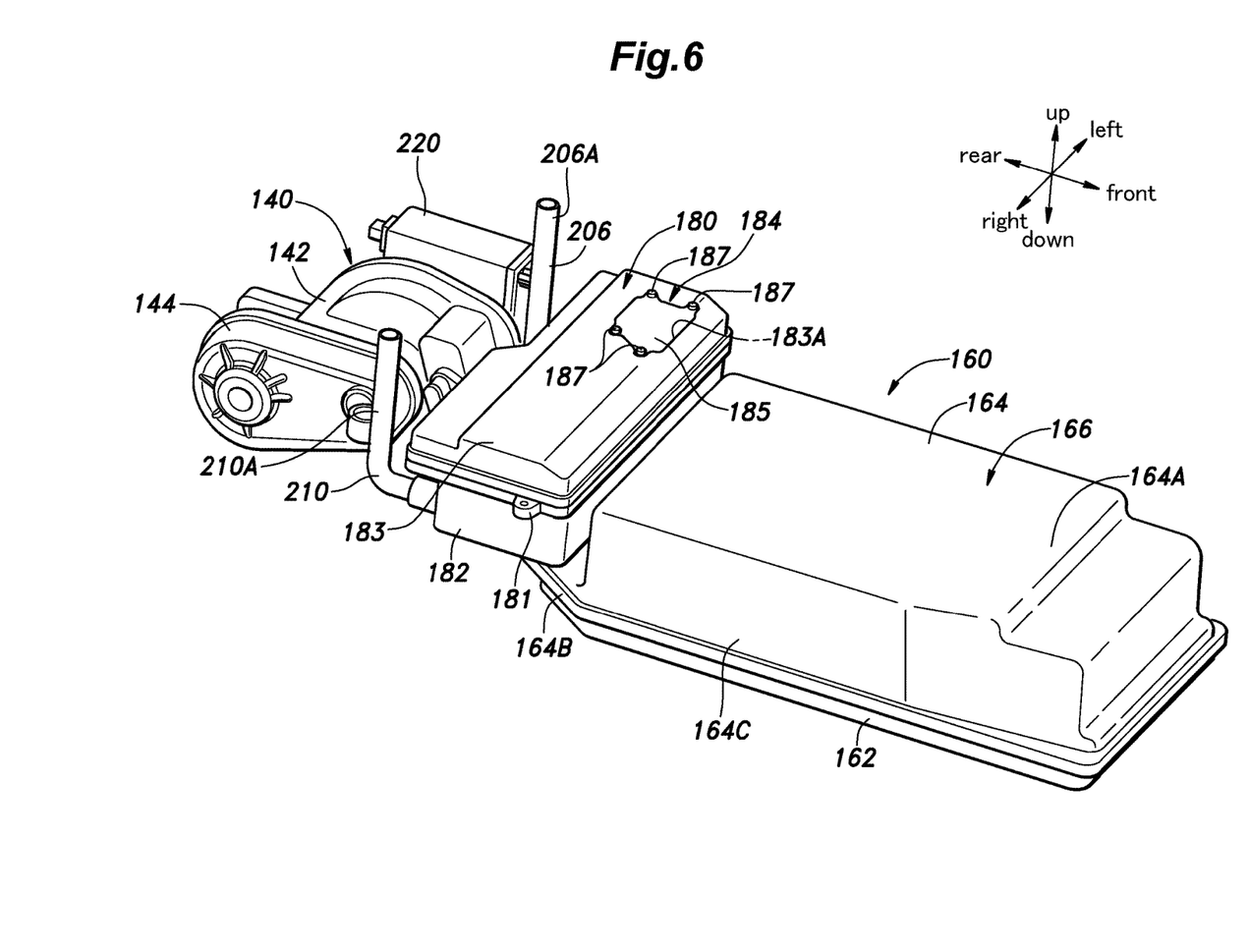
FIG. 6 is a perspective view of the battery unit, the power control unit and the power unit of the four wheel vehicle.

As shown in FIG. 6, a front part 164A of the upper case 164 is given with a taper in plan view so as to be accommodated in the space between the front side frames 10 which gets narrower toward the front. On the other hand, the base plate 162 is generally rectangular in shape because the base plate 162 extends horizontally under the front side frames 10, and does not interfere with the front side frames 10.

The battery unit 160 which is interposed between the front side frames 10 extends in the longitudinal direction from the second front middle cross member 18 (corresponding to the front lower pillars 26 in the fore and aft direction) to the overlapping portions 11 (corresponding to the center pillars 36 in the fore and aft direction). Thus, the substantially entire space under the front seat 56 surrounded by the two front side frames 10, the front lower pillars 26 and the sub cross member 122 having a high mechanical strength is utilized for housing the battery unit 160 so that the battery unit 160 can be favorably protected from external impacts.

As shown in FIGS. 6 and 7, the casing 166 is provided with a lower extension 164B extending rearward which is formed jointly by the base plate 162 and the upper case 164 and has a reduced height. The lower extension 164B does not contain any battery cells, but power cables, signal lines and accessory devices. Thus, while the base plate 162 extends horizontally over the entire part of the casing 166, the upper surface of the lower extension 164B is significantly lower than that of the main part 164C of the casing 166.

Figure 8:
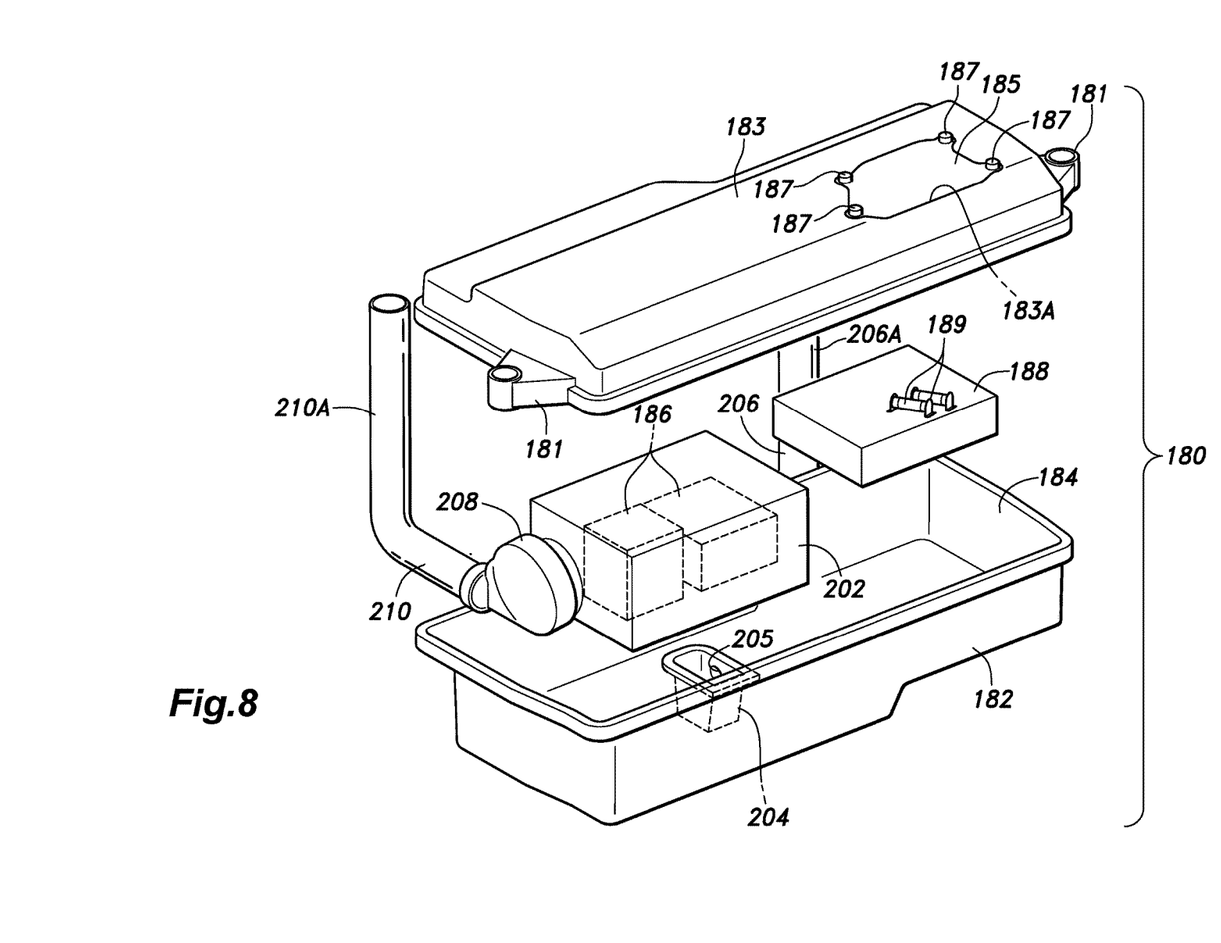
FIG. 8 is an exploded perspective view of the power control unit of the four wheel vehicle.

A power control unit 180 enclosed in an air tight electric box 184 consisting of a lower case 182 and an upper case 183 is positioned in a space created above the lower extension 164B. As shown in FIG. 8, the power control unit 180 consists of an electric power conversion unit 186 including an inverter (not shown in the drawings) and a DC-DC converter (not shown in the drawings), and an electronic control unit (ECU) 188 for controlling the supply of electric power to the electric motor 142. The electric box 184 is fixedly attached to the front side frames 10 via brackets 181 integrally formed with either side of the electric box 184. Thus, the power control unit 180 overlaps with the lower extension 164B of the battery unit 160 in plan view.

The power control unit 180 is positioned laterally between the front side frames 10 and the rear side frames 12, and longitudinally between the main part 164C of the battery unit 160 and the power unit 140. Also, the power control unit 180 overlaps with the main part 164C of the battery unit 160 in front view.

As shown in FIG. 8, fuses 189 are mounted on the upper end of the electronic control unit 188. The part of the upper case 183 immediately above the fuses 189 is formed with a maintenance hole 183A which is normally closed by a lid 185 via screws 187. The maintenance hole 183A is positioned directly under the rear seat 68 so that the lid 185 becomes accessible by removing the rear seat 68.

Figure 9:
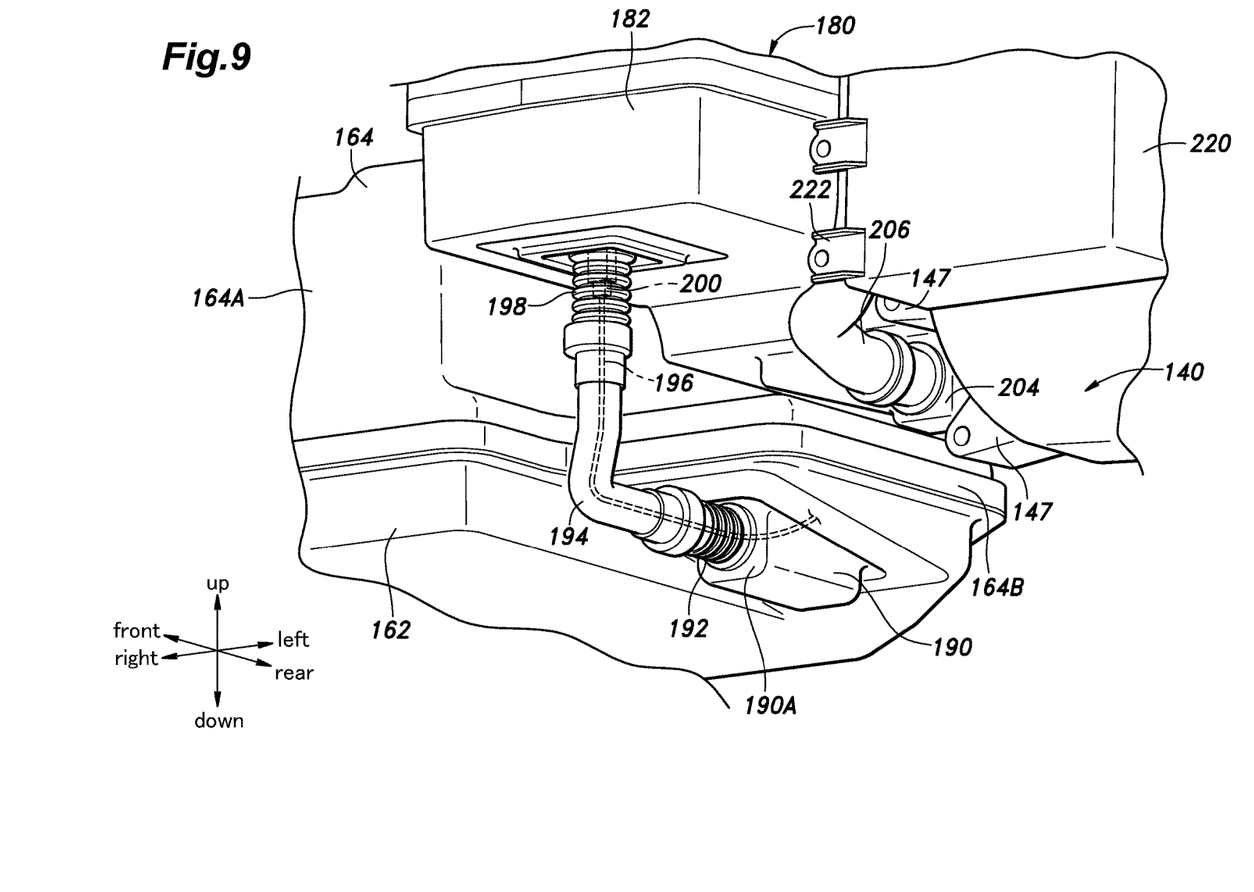
FIG. 9 is a fragmentary perspective view showing the lower part of the battery unit and the power control unit.

As shown in FIG. 9, a tube joint 190 protrudes from the lower surface of the lower extension 164B, and a hose 194 is connected to an end face 190A of the tube joint 190 facing in the outboard direction in an air tight manner via a bellows boot 192. The other end of the hose 194 is connected to the bottom surface of the lower case 182 of the electric box 184 in an air tight manner via a bellows boot 198. As there is a cutaway in the left end of the rear part of the lower extension 164B, the length of the hose 194 extending laterally from the tube joint 190 and connected to the bottom end of the power control unit 180 can be minimized. The hose 194 receives cables 196 that electrically connect the power control unit 180 with the battery unit 160. The hose 194 is connected to the lower case 182 in a detachable manner. The end of the hose 194 on the side of the lower case 182 is located at the bottom end of the lower case 182 which is readily accessible from under the vehicle.

Owing to this structure, the power control unit 180 can be electrically connected to the battery unit 160 with the cables 196 of a minimum length.

The cables 196 are connected to the power control unit 180 via a connector 200 which is configured to be connected and disconnected by being pushed upward and pulled downward, respectively, in such a manner that the connector 200 is disconnected by pulling the bellows boot 198 downward from the lower case 182, and connected by pushing the bellows boot 198 upward onto the lower case 182. Therefore, the connector 200 may be automatically connected and disconnected simply by lifting and lowering the battery unit 160 with respect to the front side frames 10.

A high power device such as an inverter and a DC/DC converter emits a significant amount of heat during operation, and this heat may adversely affect the electronic control unit 188. To overcome this problem, as shown in FIG. 8, the electric power conversion unit 186 is positioned in the casing 202 which is separate from the electronic control unit 188.

As shown in FIGS. 8 and 9, a recess 205 is formed in the bottom of the lower case 182 by a bulge 204 bulging downward from the bottom wall of the lower case 182, and the recess 205 directly communicates with a cooling air inlet (not shown in the drawings) formed in the bottom wall of the bulge 204. A base end of an air inlet duct 206 is connected to the cooling air inlet in the bulge 204, and the air inlet duct 206 extends vertically upward. An electric fan 208 is provided on a side end of the casing 202, and the suction end of the electric fan 208 is directly communicated with a cooling air outlet (not shown in the drawings) provided on the side end of the casing 202 while the outlet end of the electric fan 208 is connected to the base end of an air outlet duct 210. The air outlet duct 210 is passed through the wall of the lower case 182, and extends vertically out of the electric box 184. As shown in FIGS. 6 and 7, the free ends of the air inlet duct 206 and the air outlet duct 210 are connected to snorkel tubes 206A and 210A, respectively, extending vertically upward so that intrusion of water into the respective ducts may be avoided even when the vehicle is submerged in a certain depth of water.

Because the interior of the casing 202 is positively air cooled by the electric fan 208, the temperature in the casing 202 is controlled in such a manner that the temperatures of the inverter and the DC/DC converter can be kept within tolerable ranges at all times, and the interior of the electric box 184 accommodating the electronic control unit 188 as well as the casing 202 can be also kept within a tolerable temperature range.

Figure 5:
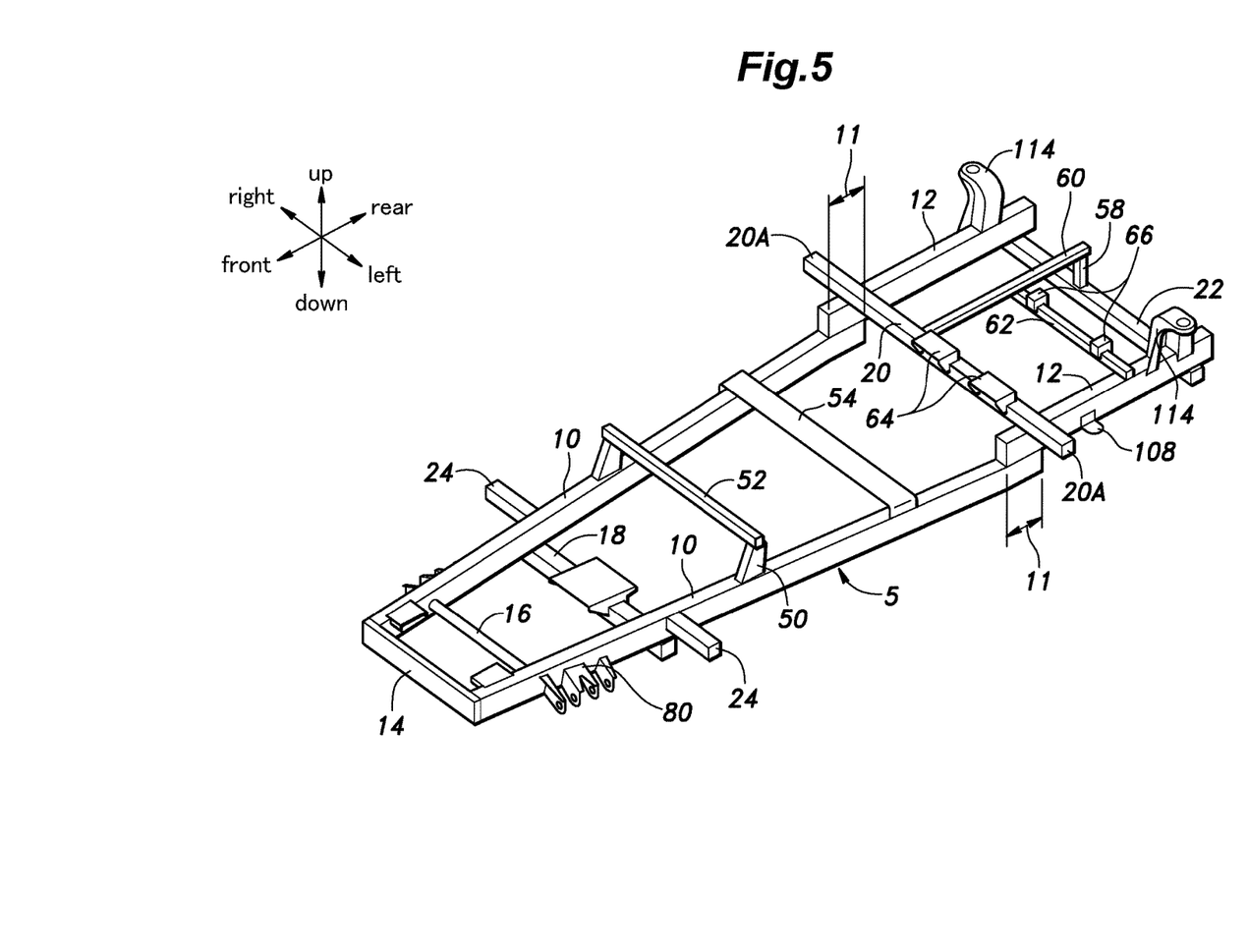
FIG. 5 is a perspective view of the lower frame of the four wheel vehicle.

As shown in FIGS. 4 and 5, an electric charger unit 220 is attached to the inboard side of the left rear side frame 12, and occupies a space defined between the power unit 140 and the left rear side frame 12. The electric charger unit 220 includes a connector via which external electric power may be supplied to the electric charger unit 220.

Features of the Illustrated Embodiment

According to the four wheel vehicle of the illustrated embodiment, because the front side frames 10 and the rear side frames 12 slant upward toward the rear ends thereof, and the rear ends of the front side frames 10 are attached to the lower sides of the front ends of the corresponding rear side frames 12 in an overlapping relationship, even when the side frames are made of straight members, a kick-up structure is formed in the rear end of the vehicle body so that the rear suspension systems 117 and the rear seat 68 can be arranged in a space efficient manner. Also, the side frames are not required to be bent or otherwise formed into special shapes so that the manufacturing process of the vehicle body can be simplified.

The spacing between the front side frames 10 progressively increases toward the rear end thereof, and a trapezoidal frame is thereby formed by the side frames 10 in cooperation with the cross members. As opposed to a parallelogram frame, the trapezoidal frame is highly resistant to deformation in the horizontal plane so that the lower frame structure of the illustrated embodiment demonstrates a high mechanical stiffness and strength against offset frontal collisions.

The spacing between the front side frames 10 progressively increases toward the rear end thereof so that the lateral spacing between the two front side frames 10 is substantially greater in the rear part thereof than in the front part thereof. Therefore, although the front suspension systems 93 each consisting of a strut suspension system requires the base end support structure therefor to be significantly offset in the inboard direction, no additional members are required to be attached to the front end of the front side frames 10, and the base end of each front suspension system 93 may be directly attached to the corresponding front side frame 10. Therefore, the need for additional members, as well as the associated reinforcement members, can be eliminated so that the front end of the vehicle body can be simplified in structure.

The rear end of the vehicle body defined by the rear side frames 12 is relatively wide so that an ample space is made available for placing the powertrain components of the vehicle in this area. Therefore, the maintenance of the powertrain is facilitated. The rear suspension systems 117 require a certain lateral space, but the large lateral width of the rear part of the vehicle body combined with the kick-up provided in the front ends of the rear side frames 12, the rear suspension systems 117 can be conveniently accommodated mostly under the rear side frames 12 with the aid of the upper brackets 114 for supporting the upper end of the dampers 116.

The battery unit 160 is positioned between the front side frames 10 and in an overlapping relationship with the front side frames 10 in side view so that the battery unit 160 is favorably protected from side impacts. The fact that each front side frame 10 extends diagonally across the battery unit 160 in side view further enhances the protective performance of the front side frames 10 against side impacts.

According to the illustrated embodiment, the battery unit 160, the power control unit 180 and the power unit 140 are arranged in a single file in that order from the front to the rear. Therefore, the wire harness and the cables can be arranged in a straight shortest path so that the wiring can be simplified, and the power loss can be minimized. Also, the space above the power unit 140 is made available for placing the rear seat 68.

The battery unit 160 is allowed to occupy the entire width of the vehicle body so that the space for the battery unit 160 can be maximized. Furthermore, the battery unit 160 is favorably exposed to the external air, and is placed away from the heat emitting components such as the power control unit 180 and the power unit 140 so that the battery unit 160 is favorable cooled, and protected from heat.

Because the power conversion unit 186 is received in the independent casing 202 separate from the electronic control unit 188, and the interior of the casing 202 is positively ventilated by the electric fan 208, not only the power conversion unit 186 is effectively cooled but also the electronic control unit 188 is favorably protected from the heat emitted from the power conversion unit 186 although the power conversion unit 186 and the electronic control unit 188 are housed in the same electric box 184.

The present invention may also be applied to a single seat vehicle having only the front seat 56. The rear part of the vehicle in this case may be used as a luggage or cargo space. Alternatively, the vehicle may seat three or more persons by placing two seats one next to the other in the front and/or in the rear. The power source of the vehicle may also consist of a combination of an internal combustion engine and an electric motor. The material for the vehicle body is not limited to steel but may also consist of aluminum or other metallic material. Various reinforced plastic materials may also be used in various parts of the vehicle body.

Although the present invention has been described in terms of a preferred embodiment thereof, it is obvious to a person skilled in the art that various alterations and modifications are possible without departing from the scope of the present invention which is set forth in the appended claims. The contents of the original Japanese patent application on which the Paris Convention priority claim is made for the present application as well as the contents of the prior art references mentioned in this application are incorporated in this application by reference.

The invention claimed is:

1. A four wheel vehicle including a pair of front wheels and a pair of rear wheels, comprising:
   a lower chassis including a pair of side frames extending in a fore and aft direction and at least one cross member connected between the two side frames;
   a front seat positioned on the lower chassis between the front wheels and the rear wheels;
   a front suspension system provided on a front end part of each side frame for supporting the corresponding front wheel;
   a rear suspension system provided on a rear end part of each side frame for supporting the corresponding rear wheel;
   an electric motor provided between the two rear wheels and between the two side frames for driving the rear wheels;
   a battery unit positioned between the two side frames and under the front seat; and
   a power control unit positioned longitudinally between the battery unit and the electric motor and laterally between the two side frames for controlling electric power supplied from the battery unit to the electric motor,
   wherein a rear end part of the battery unit consists of a lower extension having a reduced height and extending under the power control unit,
   the battery unit includes a tube joint protruding from a lower surface of the lower extension to define an end face facing in an outboard direction,
   the lower extension is provided with a cutaway that enables access to a part of a lower surface of the power control unit located above the lower extension, and
   the battery unit and the power control unit are connected to each other via a cable extending from the end face of the tube joint to the part of the lower surface of the power control unit.

2. The four wheel vehicle according to claim 1, wherein the battery unit is encased in a horizontally disposed rectangular box, and the side frames extend linearly in the fore and aft direction with an upward slant from a front part thereof to a rear part thereof such that the side frames extend diagonally across the battery unit in side view.

3. The four wheel vehicle according to claim 2, wherein a lower part of the battery unit is at least partly positioned below bottom surfaces of the side frames.

4. The four wheel vehicle according to claim 3, wherein the lower part of the battery unit is positioned entirely below the bottom surfaces of the side frames.

5. The four wheel vehicle according to claim 1, wherein the battery unit is supported by a battery mount band extending along a lower surface of the battery unit and fastened to the side frames in a detachable manner.

6. The four wheel vehicle according to claim 1, wherein the power control unit comprises an electric power conversion unit including an inverter and a DC/DC converter, and an electronic control unit for controlling supply of electric power to the electric motor; and wherein the electric power conversion unit is housed in a casing separate from the electronic control unit, and the casing is provided with a positive ventilation unit.

7. The four wheel vehicle according to claim 1, further comprising a rear seat positioned on the lower chassis above the electric motor.

* * * * *